United States Patent Office 2,925,827
Patented Feb. 23, 1960

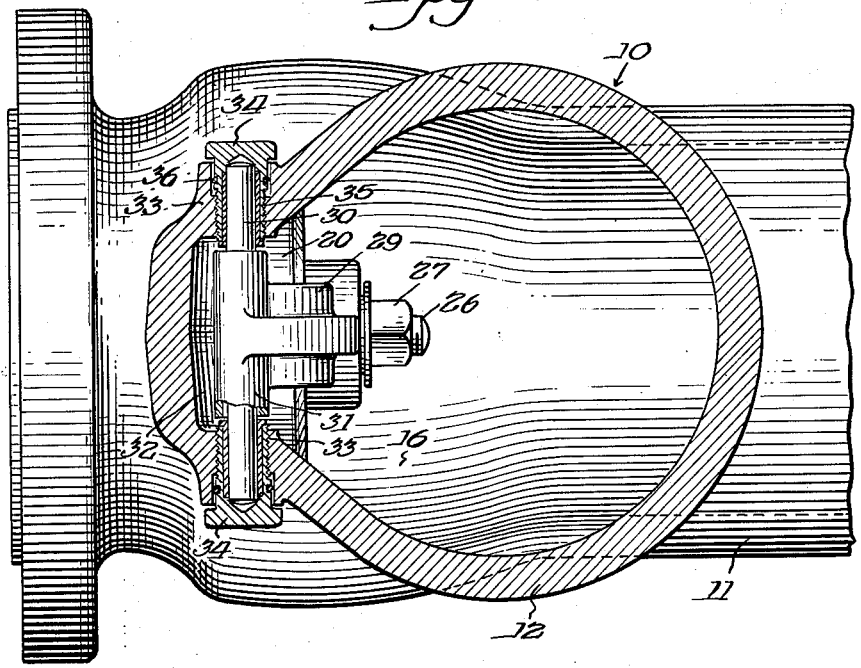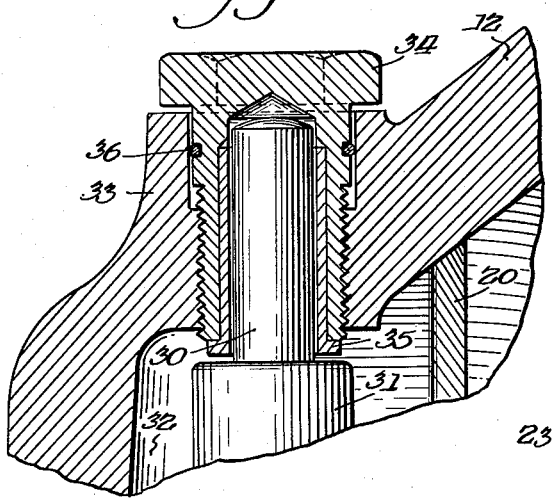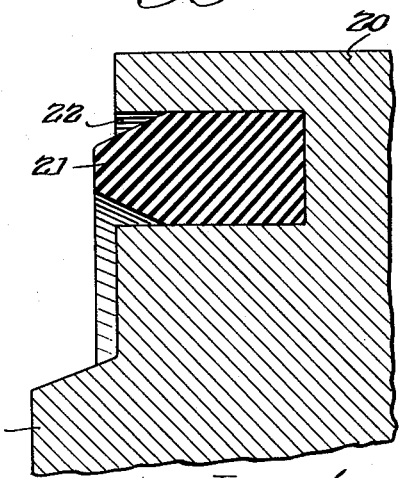

2,925,827
SWING CHECK VALVE

Andrew E. Anderson, Berwyn, and Ernest W. Geipel, Chicago, Ill., assignors to Crane Co., Chicago, Ill., a corporation of Illinois Application October 14, 1955, Serial No. 540,409

4 Claims. (Cl. 137—527.4)

The present invention relates generally to a swing check valve, and more particularly to such a valve especially useful in pipe lines or the like.

In pipe lines for conveying oil, gas, and the like, swing check valves are employed at appropriate intervals to prevent backflow. Such valves have heretofore presented a problem in that they set up considerable turbulence, impeding flow, and caused an appreciable drop in pressure, increasing the pump load. Very importantly, also, the valves obstructed the passage of "go-devils," which technically are scraping devices employed to clear the interior of pipe lines of silt deposits and incrustations of scale and the like which decrease the conveying efficiency considerably. Furthermore, the seat on the hinged valve disk was frequently subject to damage by such devices.

Another difficulty of such valves resides in centering, or transversely positioning, the valve disk in the body and preventing excessive lateral play.

The present invention solves these difficulties by providing a cylindrical valve body which substantially eliminates turbulence, pressure drop, and obstruction to cleaning implements, and employs the valve disk to cooperate in avoiding turbulence and to guide and aid cleaning devices in passage. The disk seat is protected from damage by such devices, a raised or projecting surface portion being provided on the seating face of the disk for this purpose.

The invention also provides for positively locating the disk in desired position transversely of the body and maintaining the disk against excessive lateral movement from such position, by adjusting means preferably operable from the exterior of the valve.

The present invention thus provides important improvements and advantages over prior valves of this type, which do not lend themselves to the accomplishment of these results.

It is an object of the present invention to provide a swing check valve permitting passage therethrough without snagging of cleaning or scraping devices.

Another object is the provision of a swing check valve in which the valve disk is so located in fully open position as to aid the passage of cleaning implements.

Another object is the provision of a swing check valve which minimizes turbulence and thus facilitates fluid flow therethrough.

A further object is the provision of a swing check valve in which pressure drop is substantially eliminated.

Another object is the provision of a swing check valve having a generally cylindrical body of the same internal diameter substantially throughout as the associated conduit so as to reduce turbulence and pressure drop and facilitate cleaning implement passage.

It is a further object of the invention to provide a swing check valve having a body with a radially extending access portion in which the valve disk in its fully open position substantially closes off the access portion from the body.

A further object is the provision of a swing check valve having a body with a radially extending access portion in which positioning means are employed to locate the valve disk in fully open position substantially across the juncture of the body and access portion.

Another object is the provision of a swing check valve particularly adapted to unimpeded passage of conduit-cleaning implements in which the seat on the valve disk is protected against damage.

It is an additional object to provide a swing check valve with means for adjusting the valve disk position transversely of the valve body and eliminating excessive play.

Other and further objects, advantages, and features of the invention will be apparent from the following detailed description taken in conjunction with the accompanying drawings, in which Fig. 1 is a longitudinal sectional view through a swing check valve embodying the present invention;

Fig. 3 is a horizontal sectional view taken substantially as indicated by the line 3—3 in Fig. 1;

Fig. 4 is an enlarged fragmentary view of a portion of Fig. 3; and

Fig. 5 is an enlarged fragmentary view of a portion of Fig. 1.

Figure 1:
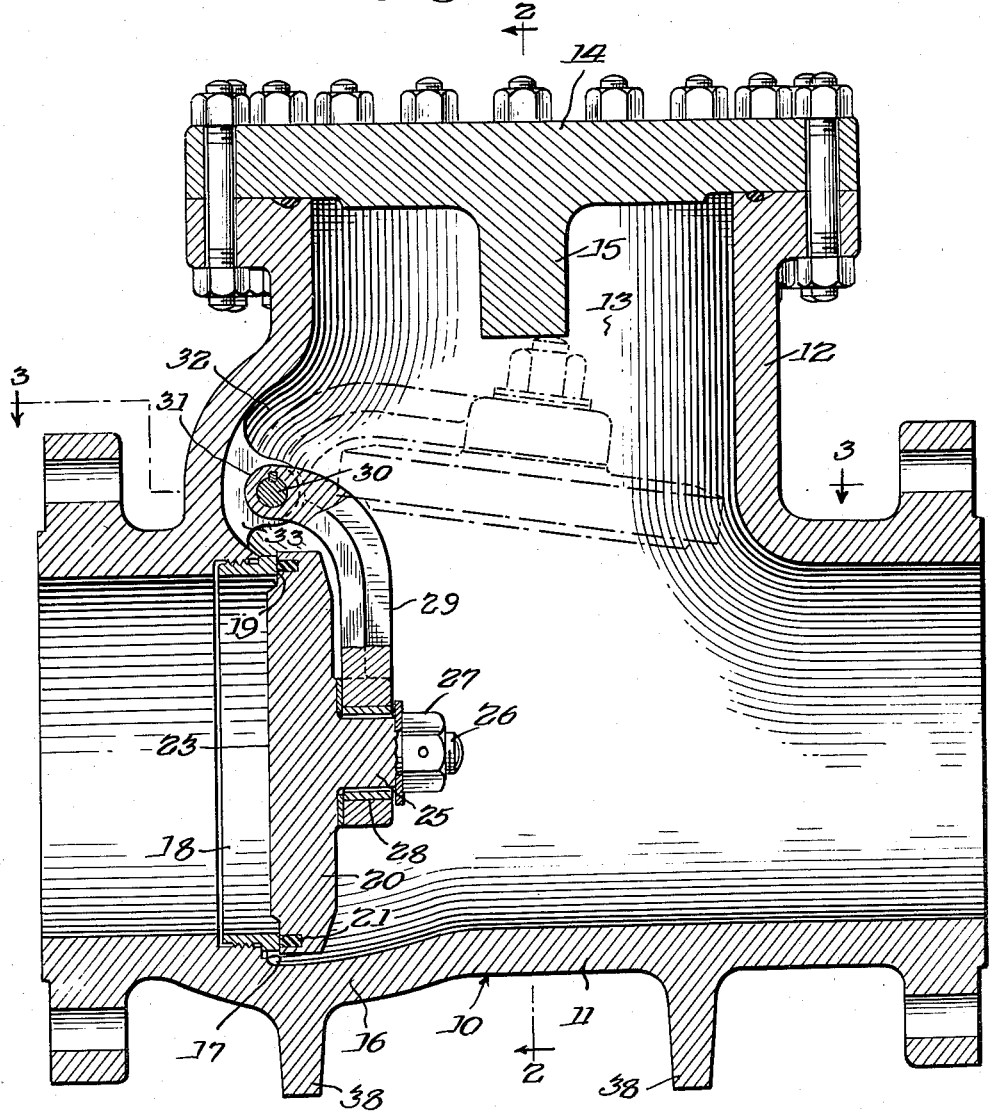
Figure 2:
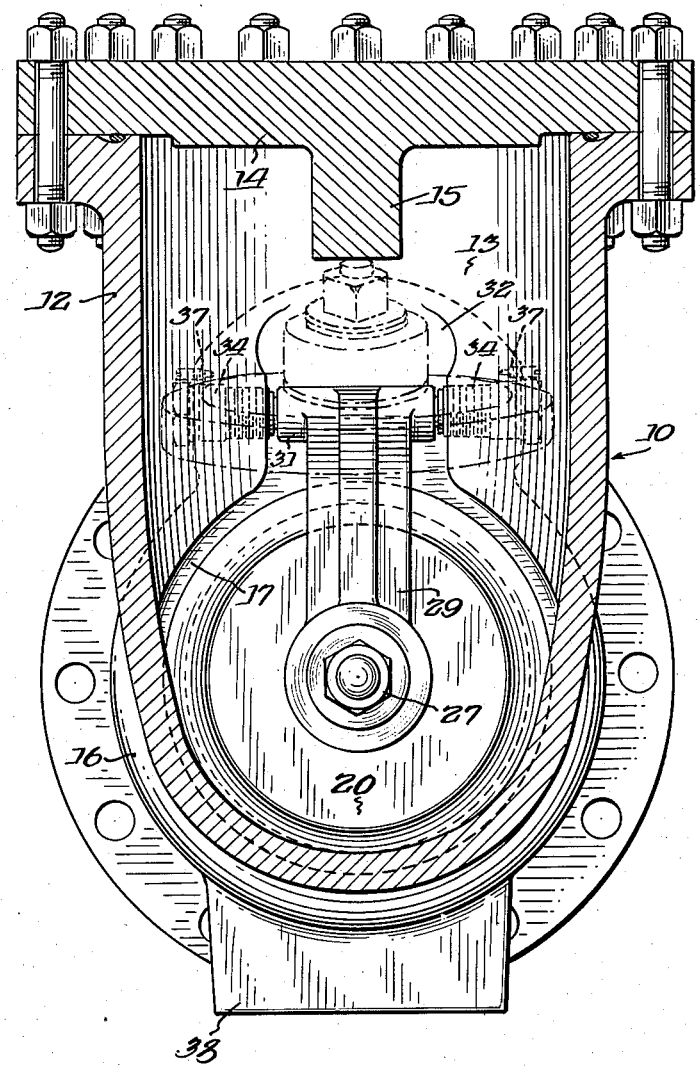
Fig. 2 is a cross-sectional view taken substantially as indicated by the line 2—2 in Fig. 1.

Referring to Figs. 1 to 3 of the drawings, there is shown a swing check valve generally designated 10 having a generally cylindrical body 11 with pipe line bolting flanges at its ends. A portion 12 of substantially cylindrical form extends radially from the body to define a recess 13 opening off the body. The outer flanged end of the portion 12 defines an opening providing access to the interior of the valve body in assembly and inspection or servicing. This opening is closed in service by a cap 14 bolted or otherwise suitably secured to the flange of portion 12, with gasket or sealing means disposed therebetween as illustrated. A stud or depending lug 15 integral with the cap 14 projects centrally therefrom into the recess 13 to serve as a limiting stop or locating means for the pivoted valve disk in fully open position, as more fully explained hereinbelow.

Substantially throughout its length, the valve body 11 is of the same internal diameter as the conduit to which it is connected, but has a circumferentially enlarged intermediate wall portion 16 adjacent the radially extending portion 12. This enlarged portion is relatively short and arcuately curved in axial section, as best shown in Figs. 1 and 3. At one end, this portion defines a shoulder 17 with one end portion of the valve body, and at the other merges with the other end portion of the body and with the radial portion 12. A body seat ring 18 of internal diameter equal to the internal body diameter is screwed or otherwise secured in the body at the shoulder 17 to provide an inwardly directed circumferential body valve seat 19 substantially perpendicular to the body axis. A valve disk 20 is provided to engage on the seat 19 to close the valve, and has a disk valve seat or ring 21 for close sealing engagement with the said body seat.

In the present instance, the valve 10 is shown as intended for use in a pipe line conveying crude oil, and the disk seat 21 is therefore shown in the form of an annular insert of synthetic rubber or the like material highly resistant to deterioration by the oil, secured in a suitable groove 22 in the seating face of the disk 20 adjacent the periphery thereof (Fig. 5). The seat 21 has an annular tapered edge projecting from the groove in open position of the valve, which is deformed and forced into the groove in engagement with the body seat 19 when the valve is closed to provide tight sealing contact. The disk seat may be of material and form other than illustrated, in accordance with service requirements. The body seat may have a facing, integral or separately formed, of a suitable material resistant to abrasion or harmful effects of the particular material flowing through the valve.

The central portion 23 of the seating face of the disk within the confines of the seat 21 is raised relative to the seat so as to project outwardly or axially beyond the plane of the seat and thus protect the seat from damage by scraping or similar cleaning devices or implements passed through the conduit. The disk seat may thus be considered as recessed in the disk, the central raised or projecting portion 23 extending within the body seat ring 18 in closed position, as shown in Fig. 1.

From the opposite face of the disk 20, there extends a central spud 25, the end portion 26 of which is reduced and threaded to receive a nut 27. A bushing 28 of suitable material is disposed on the stud, and receives thereon an apertured end of a hinge member 29 by which the disk is carried. A washer is disposed between the hinge member and the disk 20, and another washer at the other face of the hinge member is engaged by the retaining nut 27 to hold the member and the bushing 28 on the spud. The nut must be pinned or otherwise secured against turning. The connection between the disk and hinge member provides for a certain degree of looseness or play, so that the disk may tilt slightly relative to the hinge member 29 and thus adjust itself to seat closely on the body seat 19, and also so that the disk may rotate in the hinge member. A transversely mounted hinge pin 30 extends through a hub portion 31 at the other end of the member 29, parallel to the plane of the disk 20. A key or similar means holds these parts against relative rotation. Adjacent the body seat 19, the radial portion 12 has an enlargement or offset portion 32 open to the interior of the body and partially defined by wall portions spaced apart transversely of the body, that is, in a plane transverse of the body, having opposed coaxially apertured bosses 33, as best shown in Fig. 3. The bosses have inner portions threaded to receive the hollow screw plugs 34 inserted from the exterior of the enlarged portion 32. In each plug, there is snugly fitted a bushing 35 in which an end portion of the pin 30 is rotatably received. As best shown in Fig. 4, the plugs have hexagonal or similar heads for engagement by a suitable tool, and adjacent the heads have smooth shank portions engaging in corresponding outer portions of the boss apertures. Suitable seals, such as the O-rings 36 shown in Figs. 3 and 4, are provided between the plug shanks and the aperture surfaces. The bushings 35 project somewhat from the plugs and may be flanged as shown so that they may be brought into engagement with the ends of the hub portion 31 of the hinge member 29 by adjusting movement of the plugs 34. The hinge member and thus the disk 20 may therefore be centered relative to the body seat 19, that is, located at the desired position transversely of the body 11, to have the disk seat 21 engage properly on the body seat, by axial movement of the plugs in the bosses. When the desired adjustment has been made, the plugs are backed off slightly so that the bushings do not bind the hub portion. Set screws 37 threaded in the bosses 33 adjacent the plug heads (Fig. 2), or similar means, are employed to hold the plugs against turning from the adjusted position. Since the bushings are tight in the plugs, they are not only movable in either direction therewith for adjusting the position of the disk, but are withdrawable thereby from the bosses for inspection and replacement when worn. As is evident, also, the arrangement provides for ease of assembly of the parts in pivotally mounting the disk, which with the hinge member may be inserted into the valve body through the access opening, and the hinge pin inserted through the bosses and hinge member hub, with the bushed plugs then applied to the hinge pin ends. Disassembly is just as simple.

It will of course be appreciated that the widely spaced bearing points provided for the hinge pin minimize wear and assure swinging of a disk in a plane perpendicular to the body seat.

To facilitate storage, transportation, and handling of the valve, foot portions 38 are provided extending from the body opposite the radially extending portion 12, so that the valve may be stood upright on any suitable surface.

In operation, opening swinging movement of the valve disk 20 is limited by engagement of the spud 25, or more precisely the threaded end portion 26 thereof, against the stud 15 extending inwardly from the cap 14. The length of the stud is such that in its fully open position the disk is located substantially across the juncture of the portion 12 and the body 11, which may be considered the mouth of the recess 13, as shown in phantom in Figs. 1 and 2. In this position, as well as in partially open position, the disk blocks off the recess from the body, so as to minimize entrance into the recess of fluid passing through the valve, and thus reduces eddying or objectionable turbulence from this cause tending to interfere with the flow. Turbulence in any open position of the valve is also avoided by the substantially uniform cylindrical construction of the valve body throughout its length, with no deep bellies or pockets to divert straight-through flow. Similarly, drop in the fluid pressure at the valve is largely avoided by this construction.

When a scraper or similar cleaning implement is passed through the line, no obstruction to its passage is provided by the valve of this invention. Such implements are provided with scraping blades or the like resiliently urged outwardly into close contact with the inner conduit surface, and disposed more or less in helical relation to the axis of the implement. Prior valves, by reason of deeply bellied or pocketed construction, internal beads, ribs, or the like, would not permit passage of such implements, which would catch therein. The present valve, by reason of its substantially cylindrical form and the provision for locating the disk in fully open position as described, allows a "go-devil" or similar device to pass therethrough without difficulty. The disk in the full open position in effect forms substantially a continuation of the body wall across the mouth of the recess 13 so that the cleaning device is guided smoothly and without hindrance from one conduit section through the valve and on into the next conduit section. The device in its passage engages the seating face of the disk and swings the disk against the stud 15. The seat 21 on the disk is protected against damage by the cleaning device because the protruding or raised surface portion 23 of the disk serves as the device-engaging surface and holds the device out of contact with the disk seat.

The provision of the stud 15 to determine the fully open position of the valve disk also prevents damage to the disk in that the disk spud 25 engages the stud, and no portion of the disk proper engages the body or any projection in opening movement. With the hinge, the stud provides a three-point positioning of the disk when opened and by reason of the loose connection of the disk and hinge member avoids tilting and binding of the hinge pin. The stud, by holding the disk out of engagement with the walls, further assures quick closing of the disk upon reverse flow.

While the body valve seat 19 is preferably arranged perpendicularly of the valve body axis as shown, facilitating the unobstructed valve body formation, it is possible to dispose it at an angle to the axis and still provide the straight, clear passage through the valve body.

It should of course be apparent that while a preferred embodiment has been described, without departing from the spirit of the invention or the scope of the appended claims, other embodiments may be employed.

We claim:

1. A swing check valve comprising a substantially straight cylindrical body of uniform internal diameter substantially throughout its length, a circumferential valve seat in the body, a circumferentially enlarged poriton in the body adjacent said seat relatively short and arcuately curved in axial section having its greatest diameter adjacent the seat and providing a shoulder thereat, a generally cylindrical portion of at least substantially the diameter of the body extending radially from the body adjacent said seat having its axis spaced therefrom and providing an access opening and defining a radial recess opening off the body adjacent said enlarged portion, cap means closing said access opening, a valve disk having on one face a seat engaging the body seat in closed position and a portion closely surrounded by the disk seat abruptly protruding beyond the disk seat, a spud on the opposite face of the disk, hinge means secured to the disk inculding pin means having an enlarged central portion, an enlarged portion of said radially extending portion disposed adjacent said body seat and open to the body providing a pair of transversely spaced wall portions, substantially coaxial threaded apertures in said wall portions, hollow plugs threadedly adjustable in said apertures, bushings tightly fitting in said plugs journaling said pin means for swinging of the disk between open and closed positions, and engageable with said central portion for adjusting the transverse position of the hinge means and disk, and inwardly extending stop means on said cap means engaged by said disk spud in fully open position of the disk to locate the disk substantially across the juncture of the recess and body portion.

2. A swing check valve for pipe lines and the like comprising a generally cylindrical substantially straight valve body having a generally cylindrical radially extending portion defining a recess opening from the body, abutment means in the recess, a circumferential valve seat in the body adjacent said radial portion, a valve disk having on one face a sharply recessed seat to engage the body seat, a projection on the opposite face of the disk engaging said abutment means in maximum opening movement of the valve whereby said valve disk is located substantially across the juncture of said recess, a hinge member secured at one end to said projection and having hinge pin means at the other end, a pair of spaced aligned apertures in said radial portion adjacent the body seat receiving the ends of the hinge pin means, bushings on the hinge pin means within the apertures, screw plugs threadedly adjustable in the apertures interengaged with the bushings for transverse adjustment of the hinge member, and a circumferential smoothly curved enlargement of the body portion adjacent said body seat relatively short in axial section accommodating said disk.

3. A swing check valve for pipe lines and the like, comprising a substantially cylindrical valve body having a generally cylindrical radially extending portion of at least the diameter of the body defining a recess, stop means in the recess, a valve seat in the body adjacent the recess, a valve disk having on one face a seat engaging the body seat in closed position and a central portion projecting beyond said disk seat, hinge means pivoting the disk to swing about an axis adjacent the body seat and recess, a projection on the opposite face of the disk engaging said stop means to locate the disk in its fully open position substantially across the mouth of the recess, and a smoothly curved enlargement of the body adjacent the body seat short in axial section to accommodate the disk.

4. A swing check valve for pipe lines and the like, comprising a substantially cylindrical valve body having an enlarged intermediate portion and a radially extending portion adjacent the enlarged portion defining a recess opening off the body, a valve seat in the body adjacent said enlarged portion, a valve disk having on one face a central sharply raised portion and a depressed seat closely surrounding said central portion engaging said body seat in closed position, hinge means pivoting the disk to swing between open and closed positions about an axis adjacent said seat and recess, and means locating the disk in fully open position substantially across the juncture of said recess and body with said one disk face directed interiorly of the body.

References Cited in the file of this patent

UNITED STATES PATENTS

| | | |
|---|---|---|
| 1,169,718 | Garrett | Jan. 25, 1916 |
| 2,048,943 | Munn | July 28, 1936 |
| 2,265,595 | Carlson | Dec. 9, 1941 |
| 2,312,290 | Smith | Feb. 23, 1943 |
| 2,349,145 | Darnell | May 16, 1944 |
| 2,557,331 | Wintercorn | June 19, 1951 |
| 2,717,001 | Perrault | Sept. 5, 1955 |
| 2,744,489 | Gallant | May 8, 1956 |

FOREIGN PATENTS

| | | |
|---|---|---|
| 1,077 | Great Britain | Jan. 17, 1899 |
| 329,576 | Great Britain | of 1930 |
| 511,690 | Germany | Nov. 3, 1930 |